(12) United States Patent
Covezzi et al.

(10) Patent No.: US 10,155,888 B2
(45) Date of Patent: Dec. 18, 2018

(54) METHOD FOR IMPROVING THE OPERABILITY OF AN OLEFIN POLYMERIZATION REACTOR

(71) Applicant: BASELL POLIOLEFINE ITALIA S.R.L., Milan (IT)

(72) Inventors: Massimo Covezzi, Ferrara (IT); Gabriele Mei, Ferrara (IT); Maria Di Diego, Ferrara (IT); Piero Gessi, Ferrara (IT); Pietro Baita, Ferrara (IT); Roberta Pica, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 15/400,734

(22) Filed: Jan. 6, 2017

(65) Prior Publication Data
US 2017/0114254 A1    Apr. 27, 2017

Related U.S. Application Data

(63) Continuation of application No. 14/915,063, filed as application No. PCT/EP2014/066801 on Aug. 5, 2014, now Pat. No. 9,574,026.

(30) Foreign Application Priority Data

Aug. 26, 2013  (EP) ..................................... 13181717

(51) Int. Cl.
| | | |
|---|---|---|
| C09J 151/06 | (2006.01) |
| C08F 10/00 | (2006.01) |
| C08F 110/02 | (2006.01) |
| B32B 7/12 | (2006.01) |
| B32B 15/085 | (2006.01) |
| B32B 27/06 | (2006.01) |
| C08L 23/06 | (2006.01) |
| C08L 23/20 | (2006.01) |
| C08L 51/06 | (2006.01) |
| C09J 5/02 | (2006.01) |
| C09J 123/06 | (2006.01) |
| C09J 123/20 | (2006.01) |

(52) U.S. Cl.
CPC .............. *C09J 151/06* (2013.01); *B32B 7/12* (2013.01); *B32B 15/085* (2013.01); *B32B 27/06* (2013.01); *C08F 10/00* (2013.01); *C08F 110/02* (2013.01); *C08L 23/06* (2013.01); *C08L 23/20* (2013.01); *C08L 51/06* (2013.01); *C09J 5/02* (2013.01); *C09J 123/06* (2013.01); *C09J 123/20* (2013.01); *B32B 2307/718* (2013.01); *C08F 2410/02* (2013.01); *C08L 2205/02* (2013.01); *C08L 2205/03* (2013.01); *C08L 2207/062* (2013.01); *C09J 2205/306* (2013.01); *C09J 2400/166* (2013.01); *C09J 2423/00* (2013.01); *C09J 2423/04* (2013.01); *C09J 2451/00* (2013.01); *C09J 2463/008* (2013.01)

(58) Field of Classification Search
CPC ...... C08F 110/02; C08F 10/00; C08F 241/02; C09J 151/06; C09J 123/20; C09J 5/02; C08L 51/06; C08L 23/06; C08L 23/20; B32B 27/06; B32B 7/12; B32B 15/085
USPC ................................ 526/74, 89, 348; 525/35
See application file for complete search history.

(56) References Cited

U.S. PATENT DOCUMENTS

| | | | |
|---|---|---|---|
| 4,753,914 A * | 6/1988 | Eichhorn | ............... B01J 27/122 502/225 |
| 7,476,715 B2 | 1/2009 | McKay et al. | |
| 8,735,514 B2 | 5/2014 | Baita et al. | |
| 9,175,146 B2 * | 11/2015 | Mercx | ....................... C08K 3/04 |
| 2003/0211961 A1 * | 11/2003 | Lai | ..................... B01D 19/0409 510/475 |
| 2008/0116191 A1 * | 5/2008 | Allen | ..................... H05B 3/845 219/219 |
| 2009/0105428 A1 | 4/2009 | Mihan | |
| 2012/0241373 A1 | 9/2012 | Na et al. | |
| 2013/0030066 A1 | 1/2013 | Hahn et al. | |

FOREIGN PATENT DOCUMENTS

| | | |
|---|---|---|
| CN | 101466742 A | 6/2009 |
| CN | 103119069 A | 5/2013 |

* cited by examiner

*Primary Examiner* — William K Cheung

(57) ABSTRACT

The present technology relates to a method of introducing a supported antistatic compound that does not comprise a transition-metal-based catalyst component for use in an olefin polymerization reactor. In some embodiments, the methods disclosed herein avoid the formation of polymer agglomerates in the reactor and minimize potentially negative effects on catalyst yield.

8 Claims, No Drawings

METHOD FOR IMPROVING THE OPERABILITY OF AN OLEFIN POLYMERIZATION REACTOR

CROSS-REFERENCE TO RELATED APPLICATIONS

This application is a continuation application of U.S. patent application Ser. No. 14/915,063, filed Feb. 26, 2016, now issued as U.S. Pat. No. 9,574,026, which is the U.S. National Phase Application of WIPO International Application PCT/EP2014/066801, filed Aug. 5, 2014, claiming benefit of priority to European Patent Application No. 14747389.6, filed on Aug. 5, 2014, and European Patent Application No. 13181717.3, filed on Aug. 26, 2013, the contents of which are incorporated herein by reference in their entirety.

BACKGROUND OF THE INVENTION

The present technology relates to a process for the polymerization of olefins carried out in the presence of a supported antistatic compound. The technology also relates to a supported antistatic compound, a process for its preparation and its use in a process for the polymerization of olefins.

In continuous polymerization processes, for example in gas-phase processes for the polymerization of olefins, there is the need to "face up" to the formation of polymer agglomerates in the polymerization reactor, which are capable of introducing many negative effects in such processes. For example, they can disrupt the discharge of polymer from the reactor by plugging the polymer discharge valves. Furthermore, polymer agglomerates may cover the fluidization grid of the reactor, resulting in a loss in fluidization efficiency.

It has been found that the presence of fine polymer particles, or fines, in the polymerization medium favors the formation of polymer agglomerates. These fines may be present as a result of introducing fine catalyst particles or breakage of the catalyst and polymer particles within the polymerization medium. The fines are believed to deposit and electrostatically adhere to the inner walls of the polymerization reactor and the equipment for recycling the gaseous stream, for example, the heat exchanger. If the fines remain active, the particles will grow in size, resulting in the formation of agglomerates, which may also be caused by the partial melting of the polymer itself. These agglomerates when formed within the polymerization reactor may be in the form of sheets. Agglomerates can also partially plug the heat exchanger designed to remove the heat produced during a polymerization reaction.

Several solutions have been proposed to resolve the formation of agglomerates during gas-phase polymerization processes such as the deactivation of the fine polymer particles, the control of the catalyst activity and the reduction of the electrostatic charge by introducing antistatic agents inside the reactor.

EP 0359444 describes the introduction of small amounts of an activity retarder into a polymerization reactor in order to keep the polymerization rate or the content of transition metal in the polymer produced constant without forming agglomerates.

U.S. Pat. Nos. 4,803,251 and 5,391,657 describe methods for reducing polymer sheeting by adding to the reactor additives that generate positive or negative charges depending on whether the electrostatic level detected in the reactor is negative or positive, respectively. In U.S. Pat. No. 5,391,657, silicon dioxide ($SiO_2$) is mentioned among the possible negative charge generating additives.

EP 0560035 discloses a polymerization process in which an anti-fouling compound selected from alkyldiethanolamines is used to eliminate or reduce the build-up of polymer particles on the walls of a gas-phase polymerization reactor that may be fed at any stage of the gas-phase polymerization process in an amount greater than 100 ppm by weight with respect to the produced (co)polymer.

WO 2007/041810 discloses supporting an olefin polymerization catalyst together with a polysulfone antistatic compound on a porous metal oxide and using such supported antistatic catalysts in olefin polymerization.

WO 2012/041810 and WO 2012/041811 disclose methods for feeding antistatic components to a polymerization reactor by preparing a catalyst suspension incorporating the antistatic components and successively transferring the catalyst suspension to the polymerization reactor.

A detrimental side effect of the use of antistatic compounds in polymerization processes is that they also act as "catalyst poisons" and therefore, even if used in small amounts, reduce polymer yields. None of the previously described methods has successfully addressed the problematic formation of polymer agglomerates in the reactor while at the same time minimizing negative effects on catalyst yield, which may advantageously be achieved by the process of the present technology.

SUMMARY OF THE INVENTION

In some embodiments, the present disclosure provides an olefin polymerization process comprising:
(a) contacting an antistatic compound with a support in the absence of a transition-metal-based catalyst component to obtain a supported antistatic compound;
(b) introducing the supported antistatic compound into a polymerization reactor; and
(c) polymerizing an olefin in the polymerization reactor in the presence of a catalyst.

The term "antistatic compound," as used in the present description, includes:
antistatic substances capable of neutralizing the electrostatic charges of the polymer particles; and
cocatalyst deactivators that partially deactivate the aluminum alkyl co-catalyst used as a component of the olefin polymerization catalyst, provided that they do not substantially inhibit the overall polymerization activity.

An "antistatic compound" according to the present disclosure is any substance that may prevent, eliminate or substantially reduce the formation of polymer on any equipment of the polymerization plant, including sheeting on reactor walls and the deposition of polymer agglomerates onto the gas recycle line.

In certain embodiments, antistatic compounds can be selected from:
1) hydroxyesters with at least two free hydroxyl groups, such as glycerol monostearate (GMS90) and glycerol mono palmitate;
2) alcohols containing up to 7 carbon atoms;
3) ketones containing up to 7 carbon atoms;
4) polyepoxidate oils, such as epoxidized soybean oil (for example EDENOL D81) and epoxidized linseed oil (for example EDENOL D316);
5) polyglycerol esters, such as diglycerol monooleate (for example GRINSTED PGE 080/D);

6) alkyldiethanolamines of the general formula R—N(CH$_2$CH$_2$OH)$_2$ wherein R is an alkyl radical comprising between 10 and 20 carbon atoms; and 7) amides of formula R—CONR'R", wherein R, R', and R" may be the same or different, comprising a saturated or unsaturated hydrocarbon radical having 1 to 20 carbon atoms.

In some embodiments, the antistatic compounds are added to the dispersion tank of step (a) in the form of powder or micro-beads.

In certain embodiments, the antistatic sold under the trademark ATMER® 163 (synthetic mixture of alkyldiethanolamines of the general formula R—N(CH$_2$CH$_2$OH)$_2$, where R is an alkyl radical containing 13-15 carbon atoms, may be used. In further embodiments, natural-based alkyldiethanolamines may be used, for instance ARMOSTAT®410LM.

The present technology may be used in a liquid or solid form. The physical state of the antistatic depends on the melting point of the compound and on the selected temperature during its use.

In some embodiments, the support is in the form of finely divided supports and may be an organic and/or inorganic solid. For instance, the support component can be a porous support such as talc, a sheet silicate such as montmorillonite, mica, an inorganic oxide and/or a finely divided polymer powder (e.g. a polyolefin or a polymer having polar functional groups).

Examples of inorganic supports for use in the present technology include silicon dioxide, aluminum oxide and mixed oxides of the elements calcium, aluminum, silicon, magnesium or titanium and oxide mixtures. Other inorganic oxides can be used alone or in combination with the above mentioned supports, including MgO, CaO, AlPO$_4$, ZrO$_2$, TiO$_2$, B$_2$O$_3$ and mixtures thereof. Additional inorganic support materials are inorganic halides such as MgCl$_2$ or carbonates such as Na$_2$CO$_3$, K$_2$CO$_3$, CaCO$_3$ and MgCO$_3$, sulfates such as Na$_2$SO$_4$, Al$_2$(SO$_4$)$_3$ and BaSO$_4$, and nitrates such as KNO$_3$, Mg(NO$_3$)$_2$ and Al(NO$_3$)$_3$.

The inorganic support can be subjected to thermal treatment that may remove adsorbed water. In certain embodiments, the treatment is carried out at temperatures from 40 to 1000° C., including from 50 to 600° C., with drying at 50 to 200° C. carried out under reduced pressure and/or a blanket of inert gas (e.g. nitrogen). The inorganic support may be calcined at temperatures from 200 to 1000° C. for modifying the structure of the solid and/or to modify the —OH concentration on the surface.

The support can also be treated chemically using customary desiccants such as metal alkyls such as aluminum alkyls, chlorosilanes, SiCl$_4$, and methylaluminoxane. The treatment of silica gel with NH$_4$SiF$_6$ or other fluorinating agents may be used to fluorinate the silica gel surface, and treatment of the silica gels described herein with silanes containing nitrogen-, fluorine- or sulfur-containing groups may be used to further modify the silica gel surfaces. Appropriate treatment methods are described, for example, in WO 00/031090.

Organic support materials such as finely divided polyolefin powders (e.g. polyethylene, polypropylene or polystyrene) can also be used and, in some embodiments, are dried to avoid the presence of moisture, solvent residues and/or other impurities by appropriate purification and drying operations before use. It is also possible to use functionalized polymer supports comprising, e.g. polystyrene, polyethylene, polypropylene and/or polybutylene, further comprising functional groups, for example ammonium and hydroxyl groups, with at least one of the catalyst components being immobilized in certain embodiments. Polymer blends can also be used.

The use of silica gels as solid support components allows for the use of particles whose size and structure make them suitable as supports for olefin polymerization. In certain embodiments, spray-dried silica gels comprising spherical agglomerates of smaller granular particles, i.e. primary particles, may be used. The silica gels can be dried and/or calcined before use.

The silica gels described herein may be used as finely divided powders having a mean particle diameter (D50) of 5 to 200 µm, including from 10 to 150 µm, from 15 to 100 µm and from 20 to 70 µm, and may comprise pore volumes of 0.1 to 10 cm$^3$/g, including from 0.2 to 5 cm$^3$/g, and specific surface areas of 30 to 1000 m$^2$/g, including from 50 to 800 m$^2$/g and from 100 to 600 m$^2$/g. Typical silica gels suitable for use in the present technology are available, e.g. from W. R. Grace & Co, Maryland, USA.

In some embodiments, the support is generally dry, i.e. it is not suspended in a solvent and the residual moisture content is less than 5% by weight, such as less than 2% by weight and less than 0.5% by weight, based on undried (moist) support.

The antistatic compound is, in some embodiments, applied at a concentration from 10 to 60% by weight, including from 20 to 50% by weight and from 30 to 40% by weight, per gram of support component.

The support component can optionally be brought into contact with an organometallic compound before being brought into contact with the antistatic compound. Organometallic compounds for use in the present technology are methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-nheptylmagnesium, n-butyl-n-octylmagnesium, tri-n-hexylaluminum, triiscibutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof The supported antistatic compound advantageously displays very good powder flow.

Catalyst components that can be used in the polymerization process of the disclosure are Ziegler-Natta catalyst components comprising a magnesium halide, a titanium compound having at least a Ti-halogen bond, and optionally electron donor compounds. The magnesium halide may be, in some embodiments, MgCl$_2$ in active form, which is known from the patent literature as a support for Ziegler-Natta catalysts. The titanium compounds are, in certain embodiments, TiCl$_4$ and TiCl$_3$. Ti-haloalcoholates of the general formula Ti(OR)$_{n-y}$X$_y$, where n is the valence of titanium, y is a number between 1, n−1 X is halogen, and R is a hydrocarbon radical having from 1 to 10 carbon atoms, can also be used.

Other solid catalyst components which may be used are those based on a chromium oxide supported on a refractory oxide, such as silica, and activated by a heat treatment. Catalysts obtainable from those components may consist of chromium (VI) trioxide chemically fixed on silica gel. These catalysts may be produced under oxidizing conditions by heating the silica gels that have been doped with chromium (III) salts (precursor or precatalyst). During this heat treatment, the chromium (III) oxidizes to chromium (VI), the chromium (VI) is fixed and the silica gel hydroxyl group is eliminated as water.

Additional solid catalyst components which may be used are single-site catalysts supported on a carrier such as metallocene catalysts comprising:

at least a transition metal compound containing at least one n bond; and at least a cocatalyst selected from an alumoxane or a compound able to form an alkylmetallocene cation.

The catalysts may be optionally subjected to prepolymerization, such as in a loop reactor, before being fed to the polymerization reactor. The prepolymerization of the catalyst system may be carried out at a low temperature in a range from 0° C. to 60° C.

Olefins that can be polymerized in the process according to the present technology are a-olefins of the general formula $CH_2=CHR$, where R is hydrogen or a hydrocarbon radical having from 1 to 12 carbon atoms. Examples of such olefins are ethylene, propylene, 1-butene, 1-hexene and 1-octene. The olefins can be polymerized either alone to form homopolymers or in combination with dissimilar olefins to produce copolymers.

The process of the present disclosure can be carried out in any polymerization plant comprising one or more liquid-phase and/or gas-phase polymerization reactors. Suitable liquid-phase reactors are loop reactors and continuously stirred tank reactors (CSTR). Suitable gas-phase reactors include fluidized bed reactors, stirred bed reactors and reactors having two interconnected polymerization zones as described in EP 0782587 and EP 1012195.

The process according to the present technology is very effective in avoiding the formation of polymer agglomerates in the polymerization reactor and, at the same time, demonstrating surprisingly high polymerization activities.

According to another object, the present technology provides a supported antistatic compound that does not comprise a transition-metal-based catalyst component.

According to a further object, the present technology provides a process for the preparation of a supported antistatic compound comprising the step of contacting an antistatic compound with a support in the absence of a transition-metal-based catalyst component.

A still further object of this technology is the use of a supported antistatic compound free of a transition-metal-based catalyst component in a process for the polymerization of olefins.

Further advantages and characteristics of the present disclosure will appear clear from the following examples, which are provided for illustrative purposes only and are not intended to limit the scope of the disclosure.

EXAMPLES

Test Methods:
Melt Index E (MIE):
Determined according to ASTM-D 1238, condition E (190° C./2.16 kg).
Poured Bulk Density (PBD):
Determined according to DIN-53194.
Particle Size Distribution (PSD):
Determined by using a Tyler Testing Sieve Shaker RX-29 Model B available from Combustion Engineering Endecott, provided with a set of six sieves, according to ASTM E-11-87, of numbers 5, 7, 10, 18, 35, and 200, respectively.

Example 1

Silica Dehydration

Silica was loaded into a vessel and was dehydrated at 200° C. under vacuum (26 mbar) for 8 hours (lab conditions) with a residual water content of between 2000 and 5000 ppm.

Antistatic (GMS) Support:

Iso-hexane was loaded into a stirred reactor and was heated up to 55° C. GMS was loaded in the reactor up to the amount of 75 g/L. After 3 hours, silica support was loaded in the reactor up to the amount of 175 g/L with respect to the starting iso-hexane, with a total load of GMS and silica of 250 g/L and a ratio between GMS and silica of 30%/70% by weight. After 30 minutes of contact between the dissolved GMS and silica, the drying step started. The equipment was placed under vacuum (26 mbar) in order to remove the iso-hexane and the temperature was raised according to a ramp up to 90° C. in order to remove all iso-hexane. The solid (GMS on silica) was then cooled to room temperature and unloaded from the vessel.

Preparation of Prepolymerized Catalyst

A magnesium chloride and alcohol adduct containing about 3 mols of alcohol was prepared following the method described in Example 2 of U.S. Pat. No. 4,399,054, but working at 2000 rpm instead of 10000 rpm. The adduct was subjected to a thermal treatment, under nitrogen stream, over a temperature range of 50-150° C. until a weight content of 25% of alcohol was reached. Into a 2 L four-necked round flask, purged with nitrogen, 1 L of $TiCl_4$ was introduced at 0° C. Then, at the same temperature, 70 g of a spherical $MgCl_2$/EtOH adduct containing 25 wt % of ethanol and prepared as described above were added under stirring. The temperature was raised to 140° C. over 2 h and maintained for 60 min. The stirring was discontinued, the solid product was allowed to settle and the supernatant liquid was siphoned off. The solid residue, having an average particle size of about 60 micrometers, was then washed once with heptane at 80° C. and five times with hexane at 25° C., dried under vacuum at 30° C. and analyzed. Into a 260 cm³ glass reactor provided with stirrer, 351.5 cm³ of hexane at 20° C. and 7 g of the catalyst prepared as above described were introduced and stirred at 20° C. The internal temperature was kept constant and 5.6 cm³ of tri-n-octylaluminum (TNOA) in hexane (about 370 g/l) were slowly introduced into the reactor, with the temperature brought to 10° C. After 10 minutes of stirring, 10 g of propylene were carefully introduced into the reactor and kept at the same temperature for 4 hours. The consumption of propylene in the reactor was monitored and the polymerization was discontinued when a theoretical conversion of 1 g of polymer per g of catalyst was reached. The whole contents of the reaction vessel were filtered and washed three times with hexane at a temperature of 20° C. (50 g/l). After drying the resulting pre-polymerized catalyst was analyzed and found to contain 1.1 g of polypropylene per g of catalyst.

Preparation of Catalyst Suspension

A dispersion tank with an internal diameter of 14.5 cm is used. This tank is equipped with a stirrer, an external water jacket for the temperature regulation, a thermometer and a cryostat. The following components were used to prepare the catalyst suspension:

the above indicated Ziegler-Natta catalyst powder; and
white oil (Winog 70) having a viscosity of 70 cStokes at 40° C.

1005 g of white oil were fed into the dispersion tank at room temperature (25° C.). Successively, 300 g of catalyst powder were loaded to the tank containing the oil, while continuously maintaining the dispersion tank under stirring conditions.

After the introduction of the catalyst, the resulting suspension is maintained under stirring conditions for 30 minutes, with the temperature of the dispersion tank reduced to 13° C. The velocity of the stirring device is adjusted to 85 rpm during the mixing of the components of the suspension.

The obtained suspension has a catalyst concentration of about 252 g/l (grams of catalyst for liter of oil). The catalyst suspension contains the antistatic compound in a weight ratio GMS90/catalyst of 0.13.

Preparation of Catalyst Paste 431 g of molten Vaseline® grease BF (thickening agent) were fed to the dispersion tank containing the catalyst suspension at a feed temperature of 80° C. The molten thickening agent is slowly fed for 3 minutes, while stirring the catalyst suspension in the dispersion tank with a velocity of 85 rpm. The catalyst suspension is maintained at a temperature of 13° C. during the addition of the molten Vaseline® grease. The molten thickening agent rapidly solidifies on contact with the catalyst suspension. After the introduction of the molten Vaseline®, the components of the catalytic paste were maintained under stirring at 85 rpm for a time of 90 minutes. During this time the temperature in the dispersion tank is kept at 13° C.

The resulting catalytic paste has a weight ratio grease/oil of about 0.43, while the concentration of the solid (catalyst+antistatic) in the catalytic paste is equal to about 170 g/l.

Catalyst Activation

The catalytic paste is withdrawn from the dispersion tank by a dosing syringe and is then continuously transferred by means of two dosing syringes to a first catalyst activation vessel, then to a second, then to a third. Triisobutyl-aluminum (TIBAL) is used as the cocatalyst with a weight ratio of TIBAL/catalyst of 1.5. No external donor is used and propane is fed as a diluent to the activation vessels. The components were pre-contacted in three activation vessels at a temperature of 40° C. for 19, 44 and 25 minutes, respectively. The activated catalytic paste is discharged from the activation vessel and is continuously fed to a gas-phase fluidized bed reactor for the polymerization of olefins.

Polymerization

The activated catalytic paste and the supported GMS were introduced into the fluidized bed reactor, where ethylene is polymerized to produce high density polyethylene (HDPE). The polymerization is operated in the presence of propane as a polymerization diluent and hydrogen as the molecular weight regulator. The polymerization conditions and the composition of the gaseous reaction mixture are indicated in Table 1. The characterization of the HDPE discharged from the reactor is reported in Table 2.

Example 2C (Comparison)

Example 1 is repeated, with the only difference that during the preparation of catalyst suspension 40 g of microbeads of GSM were added to the suspension of catalyst powder in oil, so that the resulting catalytic paste incorporates GMS and no supported GMS was used. The polymerization conditions and the composition of the gaseous reaction mixture are indicated in Table 1. The characterization of the HDPE discharged from the reactor is reported in Table 2.

Examples 3 and 4

The procedure set forth in Example 1 was repeated, except that a different amount of GMS was used.

The polymerization conditions and the composition of the gaseous reaction mixture are indicated in Table 1. The characterization of the HDPE discharged from the reactor is reported in Table 2.

Example 5C (Comparison)

The procedure set forth in Example 2 was repeated, except that the same catalyst as in Examples 3 and 4 has been used.

The polymerization conditions and the composition of the gaseous reaction mixture are indicated in Table 1. The characterization of the HDPE discharged from the reactor is reported in Table 2.

Example 6

The procedure set forth in Example 1 was repeated, except that the catalyst components were pre-contacted in two activation vessels at a temperature of 40° C. for 19 and 44 minutes respectively, followed by a pre-polymerization treatment in a third vessel at a temperature of 40° C. for 35 minutes with a ratio ethylene/catalyst of 10 g/g.

The polymerization conditions and the composition of the gaseous reaction mixture are indicated in Table 1. The characterization of the HDPE discharged from the reactor is reported in Table 2.

By comparing the data on polymer particle size, the examples produced in accordance with the present technology significantly reduced the amount of "fines" versus the comparative examples, further resulting in a significant reduction of fouling inside the fluidized bed reactor and in the equipment arranged along the gas recycle line (compressor and heat exchanger). It is also notable that the examples produced in accordance with the present technology show a higher specific mileage.

TABLE 1

| | | Process conditions | | | | | |
|---|---|---|---|---|---|---|---|
| Example | | 1 | 2C | 3 | 4 | 5C | 6 |
| T | ° C. | 80 | 80 | 80 | 80 | 80 | 80 |
| P | barg | 24 | 24 | 24 | 24 | 24 | 24 |
| Residence time | h | 2.1 | 2.3 | 2.1 | 2.1 | 2.3 | 2.2 |
| GMS/HDPE | ppm | 89 | 97 | 55 | 92 | 99 | 73 |
| C2— | % mol | 5.4 | 7.5 | 5.3 | 5.6 | 6.6 | 5.8 |
| H2/C2— | — | 2.8 | 2.6 | 2.6 | 2.7 | 2.7 | 2.9 |
| Mileage | g/g | 4252 | 4108 | 4500 | 4101 | 4027 | 4189 |
| Specific Mileage | g/g · bar · h | 1466 | 942 | 1612 | 1385 | 1068 | 1303 |

TABLE 2

| | | HDPE characterization | | | | | |
|---|---|---|---|---|---|---|---|
| Example | | 1 | 2C | 3 | 4 | 5C | 6 |
| MIE | g/10' | 118 | 145 | 132 | 143 | 159 | 139 |
| PBD | g/cc | 0.448 | 0.492 | 0.449 | 0.459 | 0.483 | 0.451 |
| P50 | μm | 1375.6 | 1146.8 | 1244.6 | 1206.5 | 1220.6 | 1214.9 |
| <500 | % wt | 3.7 | 8.1 | 9.7 | 14.2 | 5.6 | 12.3 |
| <300 | % wt | 1.5 | 3.2 | 3.5 | 4.3 | 2.2 | 5.7 |
| <180 | % wt | 0.6 | 1.2 | 1.2 | 1.4 | 0.8 | 2.1 |
| <125 | % wt | 0.3 | 0.5 | 0.4 | 0.5 | 0.4 | 0.8 |
| <106 | % wt | 0.2 | 0.3 | 0.2 | 0.2 | 0.3 | 0.4 |

What is claimed is:

1. A supported antistatic compound comprising an antistatic compound and a support, wherein the antistatic compound is a hydroxyester with at least two free hydroxyl groups, and wherein the supported antistatic compound:
   (i) does not comprise a transition-metal-based catalyst component; and
   (ii) the support is not suspended in a solvent,
   wherein the supported antistatic compound has a residual moisture content less than 5% by weight, based on the total weight of the supported antistatic compound.

2. The supported antistatic compound of claim 1, wherein the antistatic compound is glycerol monostearate.

3. A process for the preparation of the supported antistatic compound of claim 1, comprising the step of contacting an antistatic compound with a support in the absence of a transition-metal-based catalyst component to form the supported antistatic compound,
   wherein the supported antistatic compound has a residual moisture content less than 5% by weight, based on the total weight of the supported antistatic compound.

4. The process of claim 3, wherein the antistatic compound is contacted with the support at a concentration of 10-60% by weight per gram of support.

5. The process of claim 3, wherein the antistatic compound is contacted with the support at a concentration of 20-50% by weight per gram of support.

6. The process of claim 3, wherein the antistatic compound is contacted with the support at a concentration of 30-40% by weight per gram of support.

7. A process for polymerizing an olefin, comprising the step of polymerizing an olefin in a reactor by adding the supported antistatic compound of claim 1 to a polymerization mixture containing an olefin to form a polymer, wherein the supported antistatic compound reduces the formation of polymer on equipment of the polymerization plant.

8. The supported antistatic compound of claim 1, wherein the support is silica gel.

* * * * *